US010255818B2

(12) United States Patent
Oldach

(10) Patent No.: US 10,255,818 B2
(45) Date of Patent: Apr. 9, 2019

(54) SYSTEMS AND METHODS FOR WEATHER DETECTION AND AVOIDANCE

(71) Applicant: Arnold Oldach, Phoenix, AZ (US)

(72) Inventor: Arnold Oldach, Phoenix, AZ (US)

(73) Assignee: AVIATION COMMUNICATION & SURVEILLANCE SYSTEMS, LLC, Phoenix, AZ (US)

( * ) Notice: Subject to any disclaimer, the term of this patent is extended or adjusted under 35 U.S.C. 154(b) by 0 days.

(21) Appl. No.: 15/041,964

(22) Filed: Feb. 11, 2016

(65) Prior Publication Data

US 2016/0232796 A1 Aug. 11, 2016

Related U.S. Application Data

(60) Provisional application No. 62/114,746, filed on Feb. 11, 2015.

(51) Int. Cl.
| | |
|---|---|
| *G08G 5/06* | (2006.01) |
| *G01S 13/95* | (2006.01) |
| *B64C 39/02* | (2006.01) |
| *G08G 5/00* | (2006.01) |
| *G01S 7/00* | (2006.01) |

(52) U.S. Cl.
CPC ......... *G08G 5/0069* (2013.01); *B64C 39/024* (2013.01); *G01S 7/003* (2013.01); *G01S 13/953* (2013.01); *G08G 5/0013* (2013.01); *G08G 5/0021* (2013.01); *G08G 5/0026* (2013.01); *G08G 5/0091* (2013.01); *B64C 2201/00* (2013.01); *G01S 13/951* (2013.01)

(58) Field of Classification Search
CPC . B64C 2201/00; B64C 39/024; G01S 13/951; G01S 13/953; G01S 7/003; G08G 5/0013; G08G 5/0021; G08G 5/0026; G08G 5/0069; G08G 5/0091
USPC ...................................................... 701/3–14
See application file for complete search history.

(56) References Cited

U.S. PATENT DOCUMENTS

| | | | |
|---|---|---|---|
| 6,199,008 B1 * | 3/2001 | Aratow ................. | G01C 23/00 701/120 |
| 6,259,976 B1 * | 7/2001 | Lemelson ............. | B64C 13/16 244/110 B |
| 8,159,369 B1 * | 4/2012 | Koenigs ................. | G01S 7/062 340/963 |
| 8,702,033 B2 * | 4/2014 | Regmi ................. | B64C 39/024 244/175 |
| 8,744,737 B2 * | 6/2014 | D'Angelo ............ | G08G 5/0008 701/120 |
| 8,902,100 B1 * | 12/2014 | Woodell .................. | G01S 7/04 324/74 |
| 9,132,913 B1 * | 9/2015 | Shapiro .................. | B64C 19/00 |
| 9,310,204 B2 * | 4/2016 | McGregor ......... | G06Q 10/0631 |
| 9,317,036 B2 * | 4/2016 | Wang ................... | G05D 1/0214 |
| 9,599,707 B1 * | 3/2017 | Kronfeld .............. | G01S 13/953 |

(Continued)

*Primary Examiner* — Tyler J Lee
(74) *Attorney, Agent, or Firm* — Dickinson Wright PLLC

(57) ABSTRACT

Various vehicular systems may benefit from the appropriate use of detection and avoidance of potentially dangerous scenarios. For example, autonomous aircraft may benefit from systems and methods for weather detection and avoidance. A method can include sensing, by an aircraft, an environmental condition of the aircraft. The method can also include controlling, by the aircraft, flight of the aircraft based on the sensed environmental condition.

19 Claims, 4 Drawing Sheets

(56) References Cited

U.S. PATENT DOCUMENTS

| | | | |
|---|---|---|---|
| 2005/0173594 A1* | 8/2005 | Viebahn | G08G 5/006 244/118.5 |
| 2006/0106506 A1* | 5/2006 | Nichols | G05D 1/101 701/3 |
| 2008/0046137 A1* | 2/2008 | Shue | B64C 13/16 701/10 |
| 2009/0043486 A1* | 2/2009 | Yang | G01C 21/3492 701/117 |
| 2010/0228468 A1* | 9/2010 | D'Angelo | G08G 5/0008 701/120 |
| 2011/0046823 A1* | 2/2011 | Ezerzere | G05D 1/0202 701/4 |
| 2012/0265374 A1* | 10/2012 | Yochum | G05D 1/0005 701/5 |
| 2014/0032034 A1* | 1/2014 | Raptopoulos | G08G 5/0069 701/25 |
| 2014/0277853 A1* | 9/2014 | Castillo-Effen | G08G 5/0095 701/3 |
| 2015/0336668 A1* | 11/2015 | Pasko | B64C 39/024 701/2 |
| 2016/0217694 A1* | 7/2016 | Batla | G08G 5/0034 |
| 2016/0275801 A1* | 9/2016 | Kopardekar | G08G 5/0043 |

* cited by examiner

SYSTEMS AND METHODS FOR WEATHER DETECTION AND AVOIDANCE

CROSS-REFERENCE TO RELATED APPLICATION

This application is related to and claims the benefit and priority of U.S. Provisional Patent Application No. 62/114,746, filed Feb. 11, 2015, the entirety of which is hereby incorporated herein by reference.

BACKGROUND

1. Field

Various vehicular systems may benefit from the appropriate use of detection and avoidance of potentially dangerous scenarios. For example, autonomous aircraft may benefit from systems and methods for weather detection and avoidance.

2. Description of the Related Art

Traditional aircraft were flown by pilots usually located in the cockpit of the aircraft. Today, an increasing number of aircraft are either unmanned or even autonomous. An unmanned aircraft can include an aircraft that has a remote human pilot or an autonomous aircraft. An autonomous aircraft can include an aircraft that is controlled without human intervention, such as by a computer remote from the aircraft or on board the aircraft. Some unmanned aircraft are referred to as drones.

One challenge for unmanned aircraft is dealing with weather and similar conditions. Traditional aircraft relied on a pilot evaluating weather information from a variety of instruments, as well as visual observations of the aircraft's environment. Such traditional methods of handling weather and similar conditions may not be suitable for many unmanned aircraft, and may not even be possible for certain autonomous aircraft.

While one approach is simply to plan the flights of unmanned aircraft based on advance knowledge of weather conditions, such that unmanned flights only occur in good weather conditions, this approach may have limitations. For example, such a restriction may significantly limit the operating schedule of an unmanned aircraft. Moreover, weather can change dynamically, particularly in the case of flights that last a significant amount of time, such as more than an hour.

SUMMARY

According to certain embodiments, a method can include sensing, by an aircraft, an environmental condition of the aircraft. The method can also include controlling, by the aircraft, flight of the aircraft based on the sensed environmental condition.

An apparatus, in certain embodiments, can include at least one processor and at least one memory including computer program instructions. The at least one memory and computer program instructions can be configured to, with the at least one processor, cause the apparatus at least to sense, by an aircraft, an environmental condition of the aircraft. The at least one memory and computer program instructions can also be configured to, with the at least one processor, cause the apparatus at least to control, by the aircraft, flight of the aircraft based on the sensed environmental condition.

A non-transitory computer-readable medium, according to certain embodiments, can be encoded with instructions that, when executed in hardware, perform a process. The process can include sensing, by an aircraft, an environmental condition of the aircraft. The process can also include controlling, by the aircraft, flight of the aircraft based on the sensed environmental condition.

BRIEF DESCRIPTION OF THE DRAWINGS

For proper understanding of the invention, reference should be made to the accompanying drawings, wherein.

DETAILED DESCRIPTION

Figure 1:
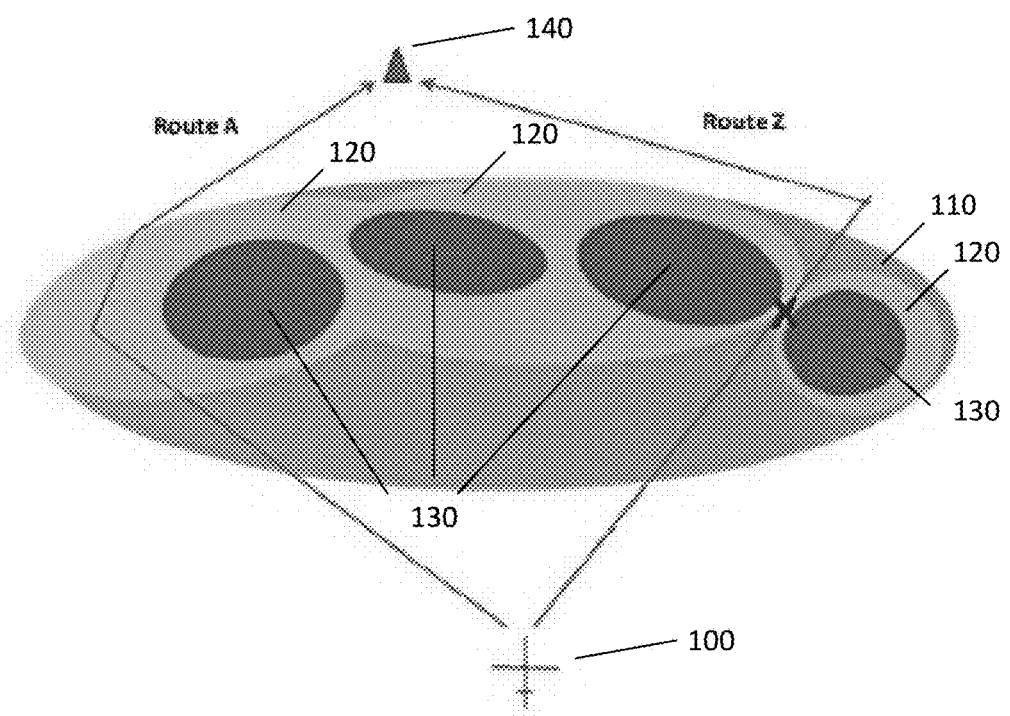
FIG. 1 illustrates alternative routes plotted against weather severity patterns, according to certain embodiments of the present invention.

Unmanned aircraft may need the ability to avoid flying into weather conditions that may cause harm to the aircraft or even cause the aircraft to crash. Certain unmanned aircraft can be equipped with radar or other sensors. The other sensors may include, for example, electo-optical sensors, infrared sensors, or the like. These sensors can be used for multiple applications, from sensing and avoiding other aircraft, weather detection and avoidance, terrain detection and avoidance or any other desired application.

Certain unmanned aircraft may have to operate autonomously or semi-autonomously. For example, even a remotely piloted aircraft may need to be designed to handle a situation in which a communication link to the remote pilot is lost or to handle weather-related aspects of flight, even if the remote human pilot is governing other aspects of the flight or merely observing and monitoring the flight. In any of these or other cases, the system may need to detect, classify, and provide navigation control to the aircraft's flight control system to avoid flying into hazardous weather conditions.

During nearly every operating scenario from aircraft autonomous operations, from ground systems monitored operations, or from ground-pilot-controlled operations, the aircraft may be capable of providing weather radar data to a ground system. These real time weather radar data can be processed by a ground system which can be used for enhancing on ground situational awareness, and providing information for the ground pilot or computer system to more effectively manage the operation of the aircraft. Similarly, the ground system may relay back the results of such processing to the aircraft, for the aircraft's own on-board computer system to use.

A weather avoidance system in an aircraft may provide data to the ground over any command and/or control links. For example, a compressed data format can be used to transmit data to a ground station. The ground controller may be able to see weather conditions with sufficient fidelity to make informed decisions about how to control the aircraft, and be able to navigate around hazardous weather conditions.

The weather avoidance system may be hosted in/on a platform that may integrate sensor data from active and/or passive sensors. Examples of active sensors include, for example, radar, electro-optical (EO) sensors, infrared (IR) sensors, and the like. Other sensors such as barometric pressure sensors are also permitted. The system may be integrated with weather data from external sources, such as satellite weather, Next-Generation Radar, ground based radar/Doppler weather radar, or other ground based weather products. The integration may provide the aircraft (for example, for autonomous operations mode), the ground system, or the ground pilot (for example, for controlled operations), more complete weather situational awareness.

A weather avoidance system according to certain embodiments of the present invention may allow for flight dispatch and continued operation of unmanned aircraft systems in all types of weather conditions.

Certain weather-related maneuvers may be more dangerous than others. For example, flights into cumulonimbus clouds can be hazardous to aircraft operations. Flying close to or into areas of convective activity can create situations where the aircraft is likely to encounter some or all of the following conditions: severe turbulence, potentially severe up and/or downdrafts, wind shear, lightning strikes, and/or heavy electrical discharge conditions (e.g., Saint Elmo's Fire), icing conditions, and heavy precipitation, perhaps including hail. All of these have the potential to disrupt the operation of the aircraft and potentially cause severe damage to an aircraft.

An airborne weather avoidance mechanism may be an additional function that may provide an unmanned aerial system (UAS) with the capability to avoid weather that has the potential for damaging the aircraft or causing the aircraft to crash. A primary capability may rely on use of an airborne radar system or other sensors that may serve multiple functions. The other sensors may include EO, IR, or the like. The multiple functions can include Due Regard, such as tracking non-cooperative targets. The functions can also include Weather Avoidance and Terrain Avoidance or any other desired function.

The Weather Avoidance function may provide, for example, the following mission support capabilities. For example, the Weather Avoidance function may detect the weather, its range, its movement relative to an aircraft flight path or any other desired paramater.

The Weather Avoidance function may also detect the weather severity and classify the severity in view of aircraft capability. This severity detection and classification may be the basis for determining what actions the aircraft and/or ground pilot may take to avoid the weather.

The Weather Avoidance function can determine storm track prediction. Moreover, the Weather Avoidance function can provide a common perspective by creating a weather image or model with established attributes. The system may be based on the ability to describe weather cells and their attributes in compressed or in any other desired form. The system can describe a set of coordinates that may create irregular polygon shapes of cell structures with severity indications or attributes within range of an aircraft flight path. Moreover, the system can describe current conditions. The current conditions may include storm movement, direction, speed, severity, trend (for example, building up/decreasing), and extent of the weather or any other desired parameter.

The Weather Avoidance function can also determine impact to flight path. Moreover, the Weather Avoidance function can calculate a weather avoidance aircraft maneuver. The calculation may be based upon aircraft performance and capability. The calculation may be based on movement, direction, severity of weather or any other desired consideration. The Weather Avoidance function may also determine to maintain current flight path based on aircraft performance and weather conditions including, direction, speed, reduction of severity or any other desired parameter.

The calculation may weigh various factors, including the capabilities or mission of the aircraft in the calculations. For example, if the mission is disaster relief and multiple unmanned aircraft are being sent in parallel, higher risk of loss may be accepted in order to ensure timely delivery of the relief. On the other hand, if the mission involves transporting human passengers, a very high priority may be placed on ensuring that the aircraft is not lost.

From a ground pilot's perspective, the aircraft may provide a set of weather radar data for the ground system to create an accurate depiction of the convective activity that may be a threat to the aircraft. The ground system may have a set of tools for the pilot to be able to make a desired decision to maintain effective operation of the mission. These tools may include a simple depiction of the hazard or calculation of suggested routes for a flight to avoid, as much as possible, the weather hazard.

The following examples may provide a perspective of a simple or compressed view of weather severity. For example, FIG. 1 illustrates alternative routes plotted against weather severity patterns, according to certain embodiments.

As shown in FIG. 1, the largest oval 110 can represent an area where there is some mild weather event, the middle sized ovals 120 can represent areas where there is a moderate weather event, and the smallest ovals 130 can represent areas where there is a severe weather event.

The system can identify one or more paths, for example, "Route A" and "Route Z" by which aircraft 100 can reach waypoint or destination 140. Route Z is marked with an "X" in FIG. 1. This may be because the system has identified this route as more risky or undesirable. Thus, while the route may meet some minimum criterion of safety because it passes through only a tiny portion of moderate weather event, the route may quickly become highly risky if the two adjacent severe events merge.

A number of additional factors that are not shown in FIG. 1 may additionally be represented and/or taken into consideration. For example, instead of a static image the representation may be presented as an animated loop of recent data ending in a current view. Thus, velocity and acceleration of the weather events may be taken into consideration in the calculations and/or presentations of the data.

Generally, a thunderstorm may be considered an example of severe weather. Nevertheless, as mentioned above, there may be certain aircraft or certain missions for which the system may nevertheless route directly through a thunderstorm, if the risk is justified.

When deviating around storms, the system may maneuver the aircraft on the upwind side of the storm, so that wind is not carrying the storm toward the aircraft, and to avoid hail that might spew from the anvil top of a cloud system. One may opt to avoid flying under thunderstorm cells themselves, where one may find powerful turbulence and intense rain or hail.

If radar paints moderate or heavy precipitation, the system may maintain safe separation from even the moderate echoes. In commercial aircraft, this may typically be 20 NM although any desired separation may be utilized. In a UAS situation, the separation may depend on the mission and the tolerance of the aircraft for operating in convective areas. Alternative safe separation ranges may be employed.

A goal of the weather avoidance system may be for an aircraft to be able to conduct its assigned mission through a full range of climate and meteorological conditions including, tropical, dry, temperate, maritime, and a range of severe weather conditions along its route of flight.

Figure 2:
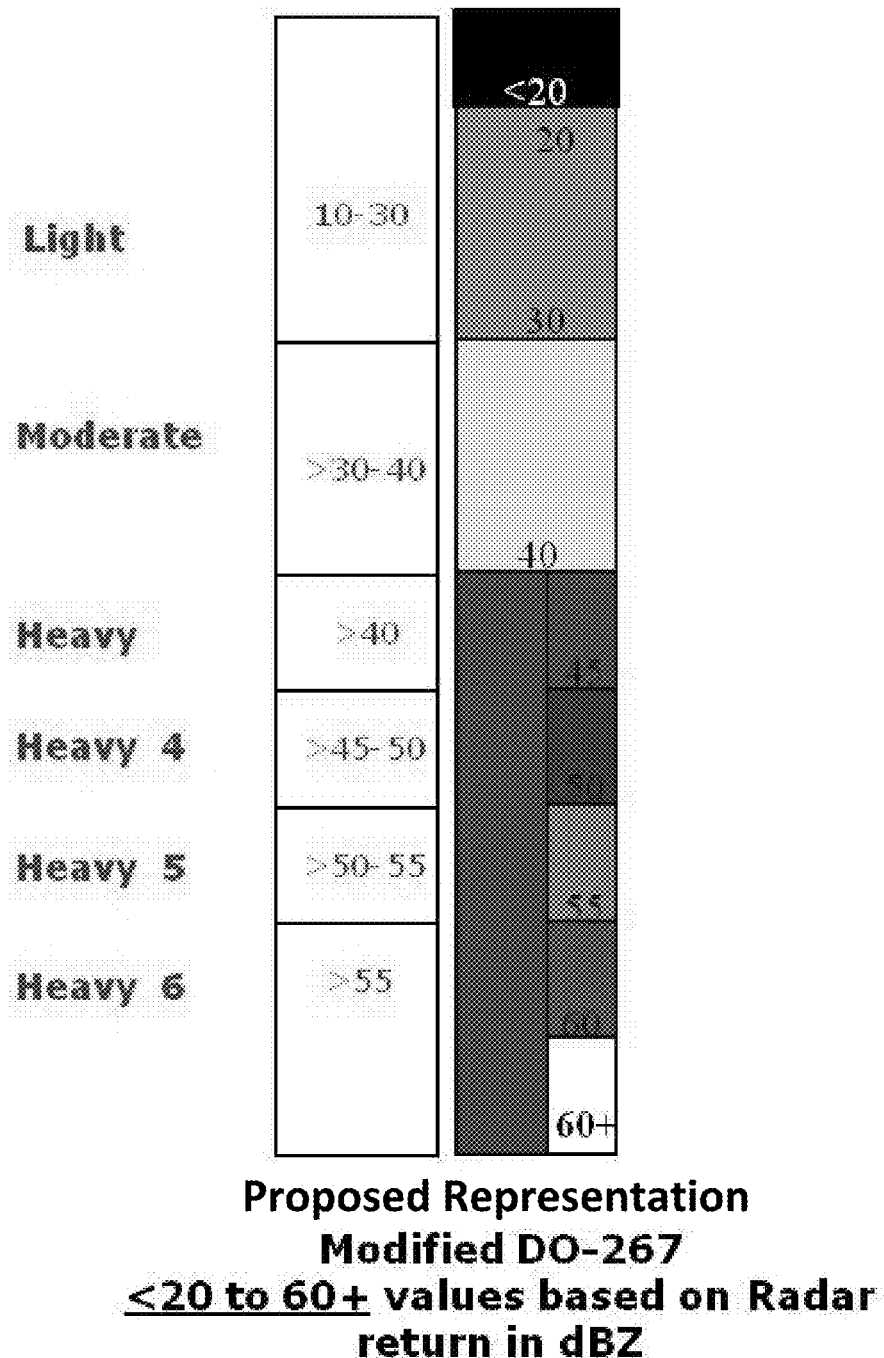
FIG. 2 illustrates a weather radar reflectivity chart, according to certain embodiments of the present invention.

FIG. 2 illustrates a weather radar reflectivity chart, according to certain embodiments. As shown in FIG. 2, a weather radar reflectivity chart can provide a representation of what shadings and presentation format may be used to indicate the severity of weather. Instead of shadings, colors could be used. For example, light could be indicated by black or green, moderate could be represented by yellow, and heavy could be indicated by red. Various degrees of heavy could be, as shown in the right column, identified by various shades of red, blue, white, or combinations thereof.

FIG. 2 is an example of what shadings and presentation format systems and methods consistent with embodiments of the present invention may employ to display. Other shadings or colorings and/or formats could be used, as desired. For example, in addition to coloring, heavy weather could be identified by other indicia, such as outlining, highlighting, and/or blinking Other options are also permitted.

Figure 3:
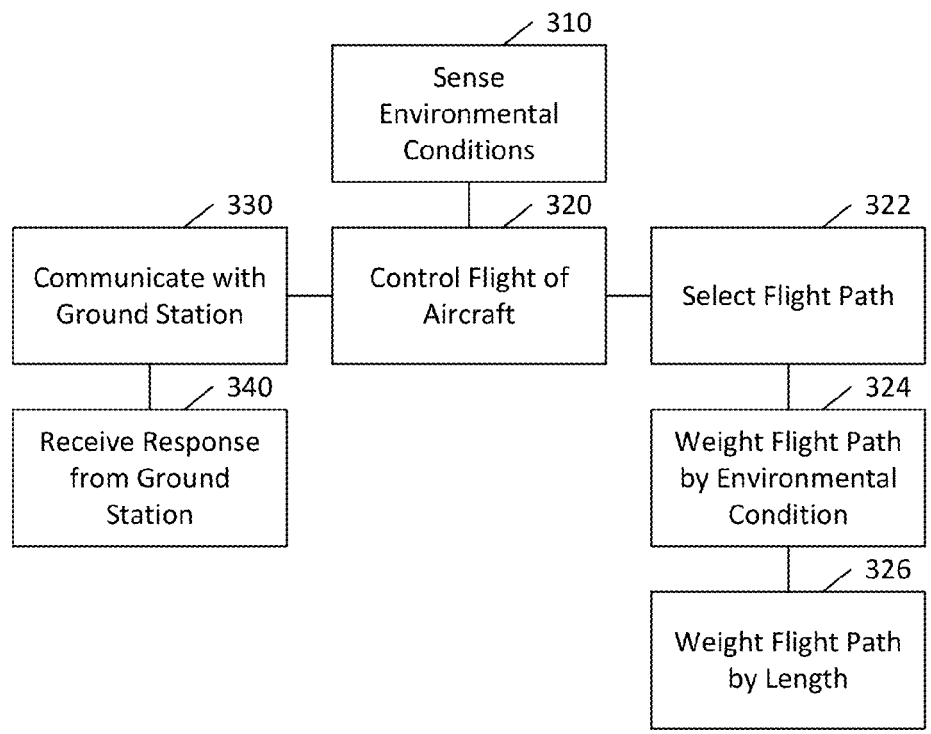
FIG. 3 illustrates a method, according to certain embodiments of the present invention.

FIG. 3 illustrates a method, according to certain embodiments of the present invention. As shown in FIG. 3, a method can include, at 310, sensing, by an aircraft, an environmental condition of the aircraft. The environmental condition can include weather. For example, the environmental condition can be a thunderstorm, hail, turbulence, tornado, hurricane, or any other desired environmental condition.

The method can also include, at 320, controlling, by the aircraft, flight of the aircraft based on the sensed environmental condition. Controlling the flight can include, at 322, selecting a flight path from a plurality of possible flight paths based on one or more environmental conditions, for example as illustrated in FIG. 1.

As shown in FIG. 3, the selecting can include, at 324, weighting each path of the plurality of possible flight paths based on a kind of environmental condition presented in each path. For example, the weighting can be based on the severity of the weather condition, for example as illustrated in FIG. 2.

As shown in FIG. 3, the selecting can include, at 326, weighting each path of the plurality of possible flight paths based on the length of the path. For example, a shorter path may be preferred over a longer path, if the environmental conditions of each path are equal.

The method can also, include, at 330, communicating with a ground station regarding the environmental condition. The method can also include, at 340, receiving a response from the ground station. The control of the aircraft can be based on commands received from the ground station. The communicating can include receiving additional environmental condition information from the ground station. The controlling can also be based on the additional environmental condition information.

The method can further integrate any of the features and aspects discussed above, for example in connection with FIG. 1 or FIG. 2. For example, the method can also include corresponding features of receiving, processing, and communicating at the ground station.

Figure 4:
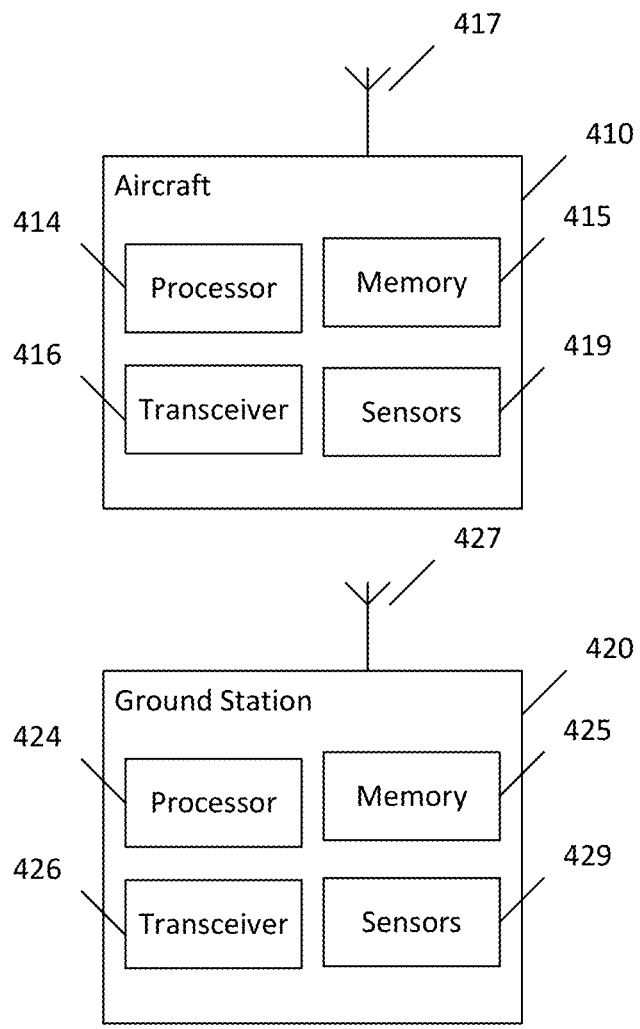
FIG. 4 illustrates a system, according to certain embodiments of the present invention.

FIG. 4 illustrates a system according to certain embodiments of the present invention. It should be understood that each block of the flowchart of FIG. 3 may be implemented by various means or their combinations, such as hardware, software, firmware, one or more processors and/or circuitry. In one embodiment, a system may include several devices, such as, for example, aircraft 410 and ground station 420. The system may include more than one ground station 420 and more than one aircraft 410, although only one of each is shown for the purposes of illustration. The aircraft can be a traditional aircraft or any kind of unmanned aircraft.

Each of these devices may include at least one processor or control unit or module, respectively indicated as 414 and 424. At least one memory may be provided in each device, as indicated as 415 and 425, respectively. The memory may include computer program instructions or computer code contained therein, for example for carrying out the embodiments described above. One or more transceivers 416 and 426 may be provided, and each device may also include an antenna, respectively illustrated as 417 and 427. Although only one antenna each is shown, many antennas and multiple antenna elements may be provided for each of the devices. Other configurations of these devices, for example, may be provided. For example, ground station 420 may be additionally configured for wired communication, in addition to wireless communication, and in such a case antenna 427 may illustrate any form of communication hardware, without being limited to merely an antenna.

Transceivers 416 and 426 may each, independently, be a transmitter, a receiver, or both a transmitter and a receiver, or a unit or device that may be configured both for transmission and reception. One or more functionalities may also be implemented as a virtual application that is provided as software that can run on a server.

A ground station 420 may be an air traffic control center, a UAS control center, or a weather specific control center. Other ground station types are also permitted.

In an exemplifying embodiment, an apparatus, such as an aircraft or ground station, may include means for carrying out embodiments described above in relation to FIG. 3.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as aircraft 410 and/or ground station 420, to perform any of the processes described above (see, for example, FIG. 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Additionally, the aircraft 410 and ground station 420 can be provided with sensors 419, 429 that can detect environmental conditions directly or indirectly.

Furthermore, although FIG. 4 illustrates a system including an aircraft 410 and a ground station 420, embodiments of the invention may be applicable to other configurations, and configurations involving additional elements, as illustrated and discussed herein.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method, comprising:
   sensing, by an aircraft, an environmental condition of the aircraft;
   determining, by the aircraft, a risk level associated with the environmental condition of the aircraft; and
   controlling, by the aircraft, flight of the aircraft based on the sensed environmental condition and the risk level,
   wherein controlling the flight comprises selecting a flight path for the aircraft from a plurality of possible flight paths for the aircraft based on the environmental condition and the risk level,
   wherein the selecting comprises weighting each path of the plurality of possible flight paths based on a kind of environmental condition presented in each path and the risk level, and
   wherein the kind of environmental condition comprises a severity level.

2. The method of claim 1, wherein the environmental condition comprises weather.

3. The method of claim 1, wherein the environmental condition comprises a thunderstorm.

4. The method of claim 1, wherein the selecting further comprises weighting each path of the plurality of possible flight paths based on the length of a path.

5. The method of claim 1, further comprising:
   communicating with a ground station regarding the environmental condition.

6. The method of claim 5, wherein the controlling is based on commands received from the ground station.

7. The method of claim 5, wherein the communicating comprises receiving additional environmental condition information from the ground station, wherein the controlling is also based on the additional environmental condition information.

8. An apparatus, comprising:
   at least one processor; and
   at least one memory including computer program instructions,
   wherein the at least one memory and computer program instructions are configured to, with the at least one processor, cause the apparatus at least to
   sense, by an aircraft, an environmental condition of the aircraft;
   determine, by the aircraft, a risk level associated with the environmental condition of the aircraft; and
   control, by the aircraft, flight of the aircraft based on the sensed environmental condition and the risk level,
   wherein control of the flight comprises selecting a flight path for the aircraft from a plurality of possible flight paths for the aircraft based on the environmental condition and the risk level,
   wherein selection of the flight path comprises weighting each path of the plurality of possible flight paths based on a kind of environmental condition presented in each path and the risk level, and
   wherein the kind of environmental condition comprises a severity level.

9. The apparatus of claim 8, wherein the environmental condition comprises weather.

10. The apparatus of claim 8, wherein the environmental condition comprises a thunderstorm.

11. The apparatus of claim 8, wherein selection of the flight path further comprises weighting each path of the plurality of possible flight paths based on a length of the path.

12. The apparatus of claim 8, wherein the at least one memory and computer program instructions are configured to, with the at least one processor, cause the apparatus at least to communicate with a ground station regarding the environmental condition.

13. The apparatus of claim 12, wherein the control of the flight is based on commands received from the ground station.

14. The apparatus of claim 12, wherein communication with the ground station comprises receiving additional environmental condition information from the ground station, wherein the controlling is also based on the additional environmental condition information.

15. A non-transitory computer-readable medium encoded with instructions that, when executed in hardware, perform a process, the process comprising:
   sensing, by an aircraft, an environmental condition of the aircraft;
   determining, by the aircraft, a risk level associated with the environmental condition of the aircraft; and
   controlling, by the aircraft, flight of the aircraft based on the sensed environmental condition and the risk level,
   wherein controlling the flight comprises selecting a flight path for the aircraft from a plurality of possible flight paths for the aircraft based on the environmental condition and the risk level,
   wherein the selecting comprises weighting each path of the plurality of possible flight paths based on a kind of environmental condition presented in each path and the risk level, and
   wherein the kind of environmental condition comprises a severity level.

16. The non-transitory computer-readable medium of claim 15, the process further comprising:
   communicating with a ground station regarding the environmental condition.

17. The non-transitory computer-readable medium of claim 15, wherein the risk level is based on at least one of a capability of the aircraft, a mission of the aircraft, or a minimum criteria of safety of the aircraft.

18. The method of claim 1, wherein the risk level is based on at least one of a capability of the aircraft, a mission of the aircraft, or a minimum criteria of safety of the aircraft.

19. The apparatus claim 8, wherein the risk level is based on at least one of a capability of the aircraft, a mission of the aircraft, or a minimum criteria of safety of the aircraft.

* * * * *